(12) United States Patent
Low (10) Patent No.: US 10,240,793 B2
(45) Date of Patent: Mar. 26, 2019

(54) SINGLE-FITTING, DUAL-CIRCUIT FUEL NOZZLE

(71) Applicant: United Technologies Corporation, Hartford, CT (US)

(72) Inventor: Kevin Joseph Low, Portland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 421 days.

(21) Appl. No.: 14/900,935

(22) PCT Filed: Apr. 22, 2014

(86) PCT No.: PCT/US2014/034864
§ 371 (c)(1),
(2) Date: Dec. 22, 2015

(87) PCT Pub. No.: WO2015/012908
PCT Pub. Date: Jan. 29, 2015

(65) Prior Publication Data
US 2016/0161124 A1 Jun. 9, 2016

Related U.S. Application Data

(60) Provisional application No. 61/841,661, filed on Jul. 1, 2013.

(51) Int. Cl.
*F23R 3/28* (2006.01)
*F02C 7/22* (2006.01)

(52) U.S. Cl.
CPC .............. *F23R 3/283* (2013.01); *F02C 7/22* (2013.01); *F02C 7/222* (2013.01); *F05D 2260/30* (2013.01); *Y02T 50/671* (2013.01)

(58) Field of Classification Search
CPC .. F23R 3/283; F23R 3/28; F23R 2900/00012; F02C 7/22; F02C 7/222; F02C 7/28
See application file for complete search history.

(56) References Cited

U.S. PATENT DOCUMENTS 3,693,889 A * 9/1972 Schuster ................ F02M 61/02
239/124
5,404,711 A 4/1995 Rajput
5,873,237 A 2/1999 Medla et al.
(Continued)

OTHER PUBLICATIONS

International Search Report for International Application No. PCT/US2014/034864.
(Continued)

*Primary Examiner* — Craig Kim
*Assistant Examiner* — Edwin Kang
(74) *Attorney, Agent, or Firm* — Cantor Colburn LLP (57) ABSTRACT

A manifold fitting receiving radial and axial manifolds and providing two radial outlets is disclosed. The manifold fitting, when used in conjunction with a fuel injector and a combustor for a gas turbine engine, reduces the radial footprint of the fuel injector and thereby allows for a more compact engine. Additionally, the manifold fitting eliminates parts, reducing weight in the process, as compared to prior art fittings. Such reductions in size, parts count, and weight are particularly beneficial for aircraft applications.

15 Claims, 6 Drawing Sheets

(56) References Cited

U.S. PATENT DOCUMENTS

| | | | |
|---|---|---|---|
| 6,354,085 B1* | 3/2002 | Howell | F23R 3/283 |
| | | | 239/590 |
| 2004/0006989 A1 | 1/2004 | Stuttaford et al. | |
| 2005/0198965 A1 | 9/2005 | Henriquez et al. | |
| 2011/0197588 A1 | 8/2011 | Khosla et al. | |
| 2012/0145273 A1* | 6/2012 | Pelletier | F02C 7/222 |
| | | | 138/111 |

OTHER PUBLICATIONS

Written Opinion for International Application No. PCT/US2014/034864.

\* cited by examiner

SINGLE-FITTING, DUAL-CIRCUIT FUEL NOZZLE

FIELD OF THE DISCLOSURE

The present disclosure generally relates to fuel injectors and, more particularly, to the fitting of fuel supplies entering a fuel injector.

BACKGROUND OF THE DISCLOSURE

A gas turbine engine, typically used as a source of propulsion in aircraft, operates by drawing in ambient air, combusting that air with a fuel, and then forcing the exhaust from the combustion process out of the engine. A fan and compressor section, having low and high pressure compressors each with a plurality of blades rotating between a plurality of vanes, rotate to draw in and compress the ambient air. The compressed air then flows into the combustor, where it is split. A portion of the air is used to cool the combustor while the rest is mixed with a fuel and ignited.

Typically, an igniter generates an electrical spark to ignite the air-fuel mixture. The products of the combustion then travel out of the combustor as exhaust and through a turbine section. The turbine section, having high and low pressure turbines and a plurality of blades extending from each turbine, is forced to rotate as the exhaust expands through the turbine blades. The turbine section, fan, and compressor section are connected by concentrically mounted engine shafts running through the center of the engine. Thus, as the turbines rotate from the exhaust, not only is thrust created, but the fan and corresponding compressor rotate to bring in and compress new air. Once started, it can thereby be seen that the process is self-sustaining.

Combustors for gas turbine engines typically have a wall with a plurality of air holes, such as cooling or dilution holes, for admitting compressed air into the combustor. In an annular combustor, outer and inner walls cooperate to define, and are separated by, an annular combustion chamber. In most combustors, at least one igniter is also provided for igniting the air-fuel mixture extends through a wall of the combustor into the combustion chamber.

An annular combustor may further have a bulkhead, which may be segmented into panels in some combustor designs, at a forward end of the combustor and extending from the outer wall to the inner wall. At least one fuel nozzle extends through this bulkhead and into the combustion chamber to release the fuel. A swirler is generally positioned around each fuel injector to admit combustion air, create turbulence in the combustion air, and mix the combustion air and the fuel before the mixture is combusted.

Current combustor technology requires fuel nozzles which provide both a primary and a secondary flow of fuel to the combustor. Conventional fuel nozzles have a separate fitting, such as a b-nut, to attach each manifold, which provide the dual flow for these nozzles. While effective, these fittings are typically large, extend radially outward from the combustor, and require a large work tool access area in order to provide maintenance or to replace the fuel nozzles. Such large fittings and access areas increase the overall geometric envelope of the fuel nozzle and cause packaging difficulties for the engines.

When utilized in conjunction with aircraft, space and weight are at a premium and the engines must be as light and compact as possible. Therefore it can be seen that a fuel nozzle which can provide this dual flow of fuel to a combustor while requiring fewer parts and less space in the engine is needed.

SUMMARY OF THE DISCLOSURE

In accordance with one aspect of the disclosure, a manifold fitting is disclosed. The manifold fitting may include a tube and a sleeve surrounding the tube. The sleeve and tube may extend along a longitudinal centerline of the manifold fitting and form a sleeve cavity therebetween. A first manifold may intersect the manifold fitting radial to the centerline and may be in fluid communication with the sleeve cavity. A second manifold may intersect the manifold fitting co-axial with the centerline and may be in fluid communication with the tube. A first outlet may be radial to the centerline and in fluid communication with the tube. A second outlet may be radial to the centerline and in fluid communication with the sleeve cavity.

In a refinement, the manifold fitting may further include a fitting circumscribing the second manifold and defining a cavity therebetween. The cavity may be in fluid communication with the sleeve cavity. The first manifold may intersect, and communicate through, the fitting to the cavity.

In a further refinement, the fitting may be sealed with the sleeve and the second manifold may be sealed with the tube.

In yet a further refinement, an o-ring may seal the fitting with the sleeve and the second manifold with the tube.

In another further refinement, a ferrule may surround and seal a joint between the fitting with the sleeve.

In another refinement, the tube defines a chamber in fluid communication with the second manifold and the first outlet. The tube may further define a tube cavity in fluid communication with the first sleeve cavity and the second outlet.

In a further refinement, the sleeve and tube may be connected by an abutment. The abutment may form a second sleeve cavity between the tube and the sleeve, with the second sleeve cavity communicating between the chamber and the second outlet.

In another refinement, the manifold fitting may further include a fluid filter positioned inside the tube.

In yet another refinement, the manifold fitting may further include a fluid filter positioned in the sleeve cavity.

In still another refinement, the manifold fitting may further include a flow limiter positioned inside of the tube.

In accordance with another aspect of the present disclosure, a manifold fitting is disclosed. The manifold fitting may include a tube and a sleeve surrounding the tube forming a sleeve cavity therebetween. The tube may be in fluid communication with a first outlet. The sleeve cavity may be in fluid communication with a second outlet. A first manifold may be co-axial, and in fluid communication with, the tube. A fitting may circumscribe the first manifold defining a cavity therebetween in fluid communication with the first sleeve cavity. A second manifold may extend radially from the fitting and may be in fluid communication with the cavity.

In a refinement, a ferrule may surround and seal a joint between the fitting and the sleeve.

In another refinement, the first manifold may be sealed with the sleeve and the second manifold may be sealed with the tube.

In a further refinement, an o-ring may seal the first manifold with the sleeve and another o-ring may seal the second manifold with the tube.

In another refinement, the tube may define a chamber in fluid communication with the second manifold and the first outlet. The tube may further define a tube cavity in fluid communication with the first sleeve cavity and the second outlet.

In yet another refinement, the sleeve and the tube may be connected by an abutment, which may form a second sleeve cavity between the tube and the sleeve. The second sleeve cavity may be in fluid communication with the chamber and the second outlet.

In accordance with yet another aspect of the present disclosure, a fuel injector of a combustor is disclosed. The fuel injector may include a fuel nozzle extending into the combustor and a stem extending away from the fuel nozzle. A manifold fitting may extend from the stem and have a centerline extending in a non-radial direction with respect to the combustor. The manifold fitting may further include a tube and a sleeve surrounding the tube which may form a first sleeve cavity therebetween. A first manifold may intersect the manifold fitting radial to the centerline and may be in fluid communication with the first sleeve cavity. A second manifold may intersect the manifold fitting co-axial, and in fluid communication, with the tube. A first outlet may be radial to the centerline and in fluid communication with the tube. A second outlet may be radial to the centerline and in fluid communication with the first sleeve cavity.

In a refinement, each manifold may be in fluid communication with a separate fuel supply.

In another refinement, the manifold fitting may further include a fitting circumscribing the second manifold and defining a cavity therebetween. The cavity may be in fluid communication with the first sleeve cavity, the first manifold may intersect and communicate through the fitting to the cavity.

In yet another refinement, the tube may define a chamber volume in fluid communication with the second manifold and the first outlet. The tube may further define a tube cavity in fluid communication with the first sleeve cavity and the second outlet.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
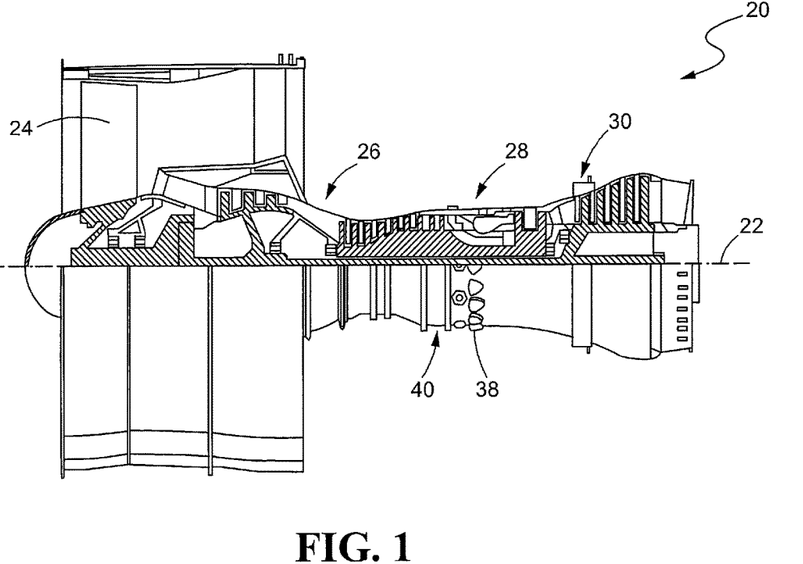
FIG. 1 is a partial sectional view of a gas turbine engine constructed in accordance with the present disclosure.

Referring now to the drawings, and with specific reference to FIG. 1, an exemplary gas turbine engine generally referred to by numeral 20 and depicted as a turbofan type of gas turbine engine is disclosed. The engine 20 typically has a plurality of axially aligned components, generally centered around a central axis 22, including, but not limited to, a fan 24, a compressor section 26, a combustor 28, and a turbine section 30. The function and structure of each of these components are well known in the art, and will not be further described herein, except where needed to adequately describe the invention.

Figure 2:
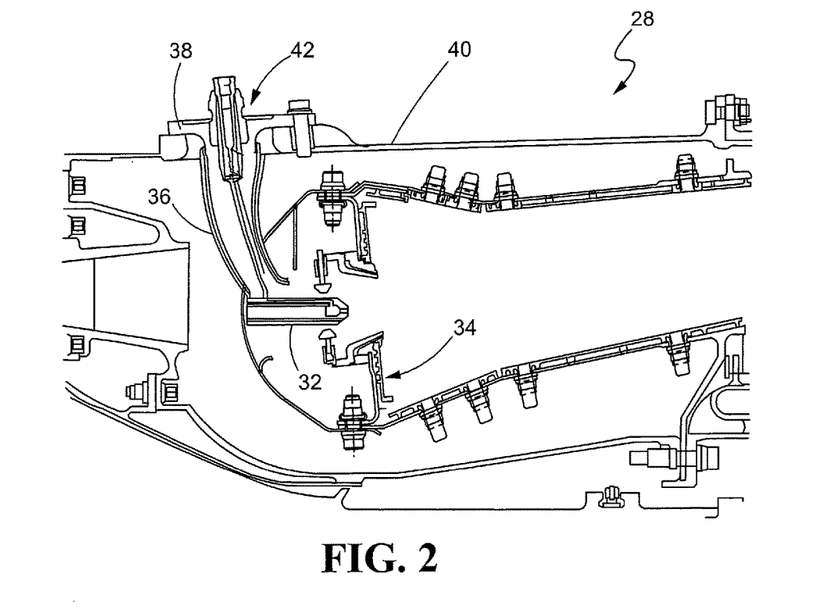
FIG. 2 is a longitudinal sectional view of an annular combustor constructed in accordance with the present disclosure.

Turning now to FIG. 2, an exemplary annular combustor 28 is depicted. Typically, a plurality of fuel nozzles 32 extend axially through a bulkhead 34 of the combustor 28 to release a fuel, which is combusted with compressed air. Only one fuel nozzle 32 is depicted in FIG. 2 for illustration purposes but typically between twelve and twenty-four fuel nozzles extend through the forward bulkhead 34. However, any number of fuel nozzles is possible.

Figure 3:
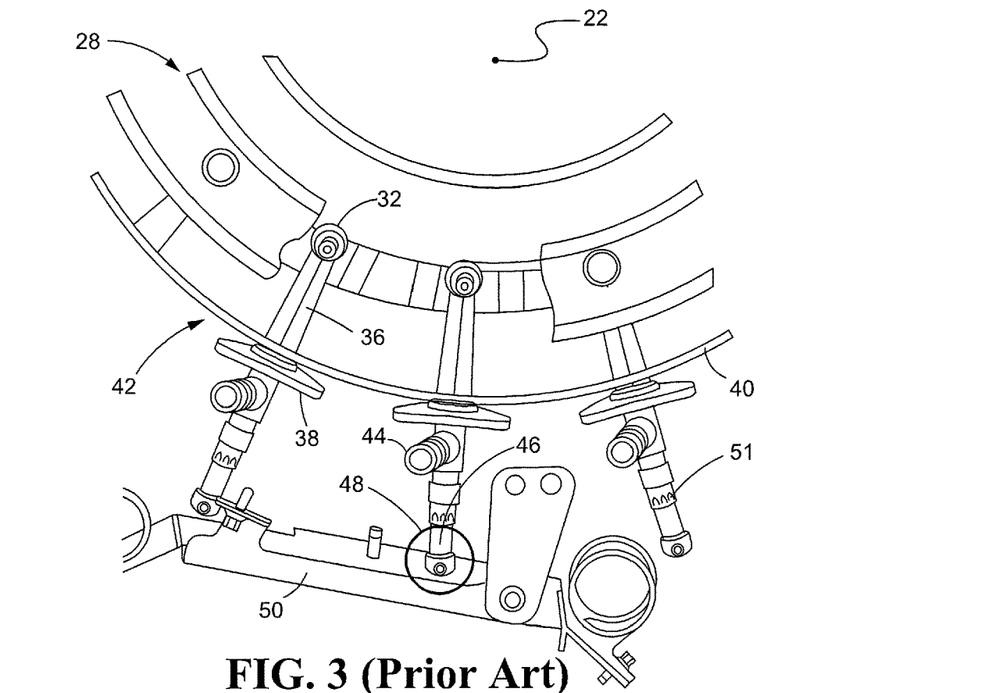
FIG. 3 is a partial sectional view of a gas turbine engine detailing prior art manifold fittings and a collision with an engine component.

As can be seen in FIG. 2, a stem 36 extends radially between a fuel injector mount 38 and the fuel nozzle 32 through an engine case 40. The engine case 40 circumscribes the engine 20, and the injector mount 38 mounts a fuel injector 42, including the stem 36 and fuel nozzle 32, to the engine case 40. As can be seen in FIG. 3, prior art duplex fuel injectors 42, that is fuel injectors having a dual fuel flow, include and are supplied with fuel through a first, axially extending, manifold 44 and a second, radially extending, manifold 46. Because of the large radial height of the second manifold 46, packaging difficulties exist with such prior art designs, such as contact with an engine component 50, indicated in FIG. 3 by numeral 48, or the increased space require to wrench a b-nut 51 of such prior art fittings.

Figure 4:
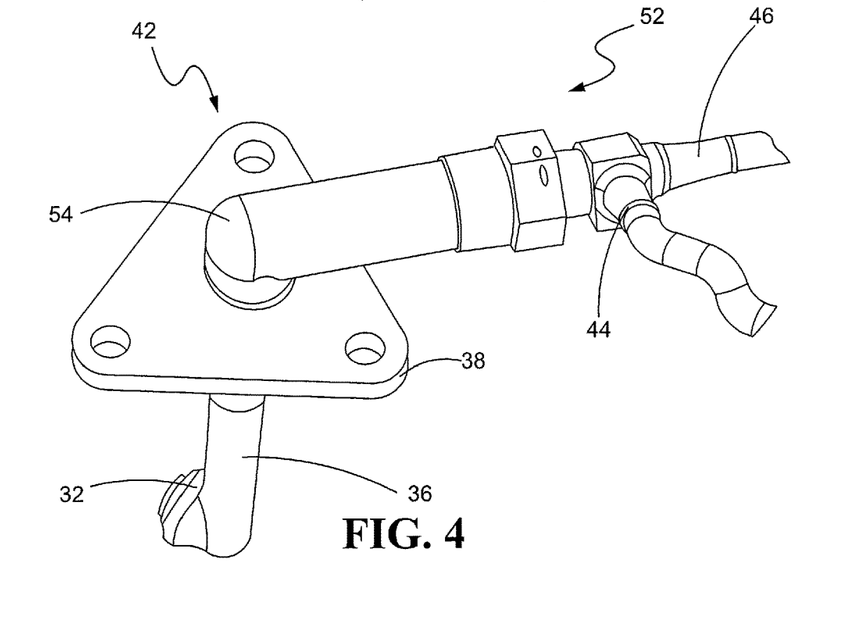
FIG. 4 is a perspective view of a fuel injector and manifold fitting constructed in accordance with an embodiment of the present disclosure.

To reduce the space required by the fuel injectors 42, and specifically this dual-manifold fitting, the inventors have designed an axially extending manifold fitting 52, an exemplary embodiment of which is depicted in FIG. 4. The fuel nozzle 32 itself may be any duplex fuel nozzle, and remains unaltered by the present disclosure. However, the present disclosure drastically departs from the prior art by providing the fitting 52 with a circumferentially extending first manifold 44 an axially extending second manifold 46. The axially aligned fitting 52 bends at an elbow 54 to extend radially inward and connect with the mount 38. This exemplary fitting 52 has a reduced radial height compared with prior art fittings and therefore does not contact the engine components 50 as prior art fittings may, allowing for a more compact engine 20. Further, as will be seen below, the b-nut 51 needed by the prior art has been eliminated from the fitting 52, reducing the part count and weight of the fitting 52, while at the same time reducing the wrenching access space needed to remove the b-nut 51.

Figure 5:
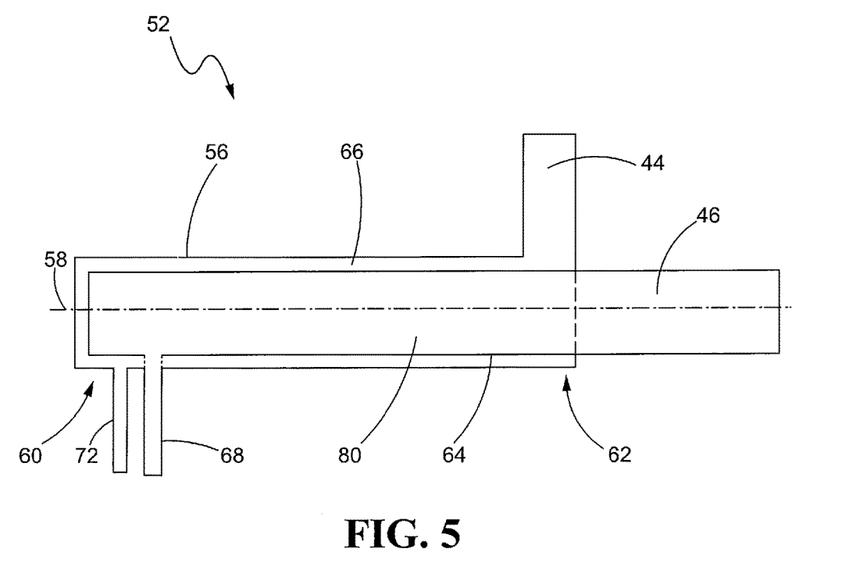
FIG. 5 is a sectional view of a manifold fitting constructed in accordance with an embodiment of the present disclosure.

Another embodiment constructed in accordance with the present disclosure is depicted in cross-section in FIG. 5. As shown therein, a sleeve 56 of the fitting 52 extends axially along a centerline 58 from a proximal end 60 of the fitting 52 towards a distal end 62 of the fitting 52. A tube 64 is positioned interior to the sleeve 56 and extends axially from the proximal end 60 towards the distal end 62. A first sleeve cavity 66 is thereby formed between the tube 64 and the sleeve 56. In the embodiment depicted in FIG. 5, the first sleeve cavity 66 is annular in shape and extends the axial length of the tube 64. However, one skilled in the art will understand that the first sleeve cavity 66 may be of any shape which can communicate a fluid as described herein. At the proximal end 60 of the fitting 52, a first fluid outlet 68 is in fluid communication with the tube 64 and a second fluid outlet 72 is in fluid communication with the first sleeve cavity 66.

Figure 6:
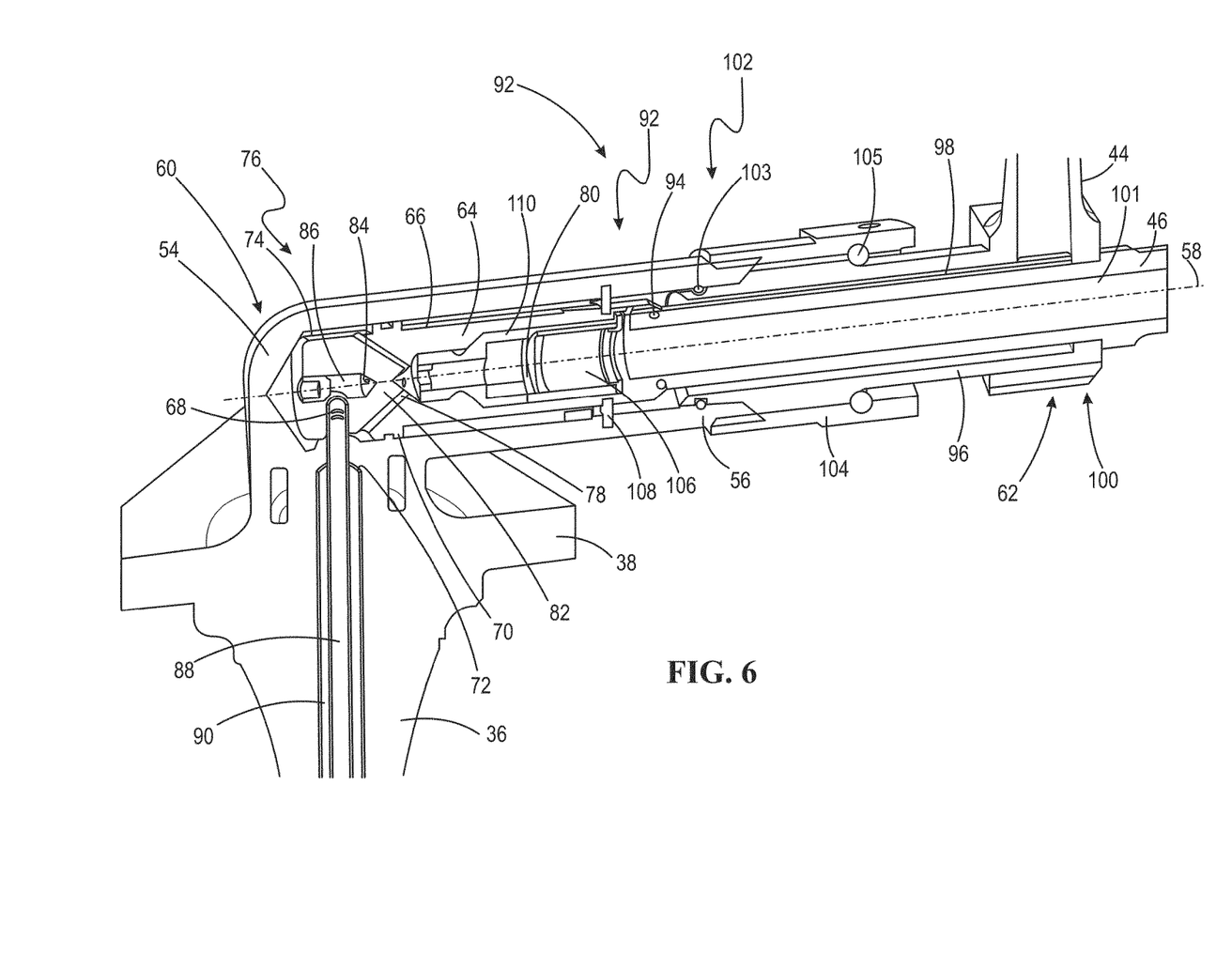
FIG. 6 is a sectional view of another manifold fitting constructed in accordance with an embodiment of the present disclosure.
Figure 7:
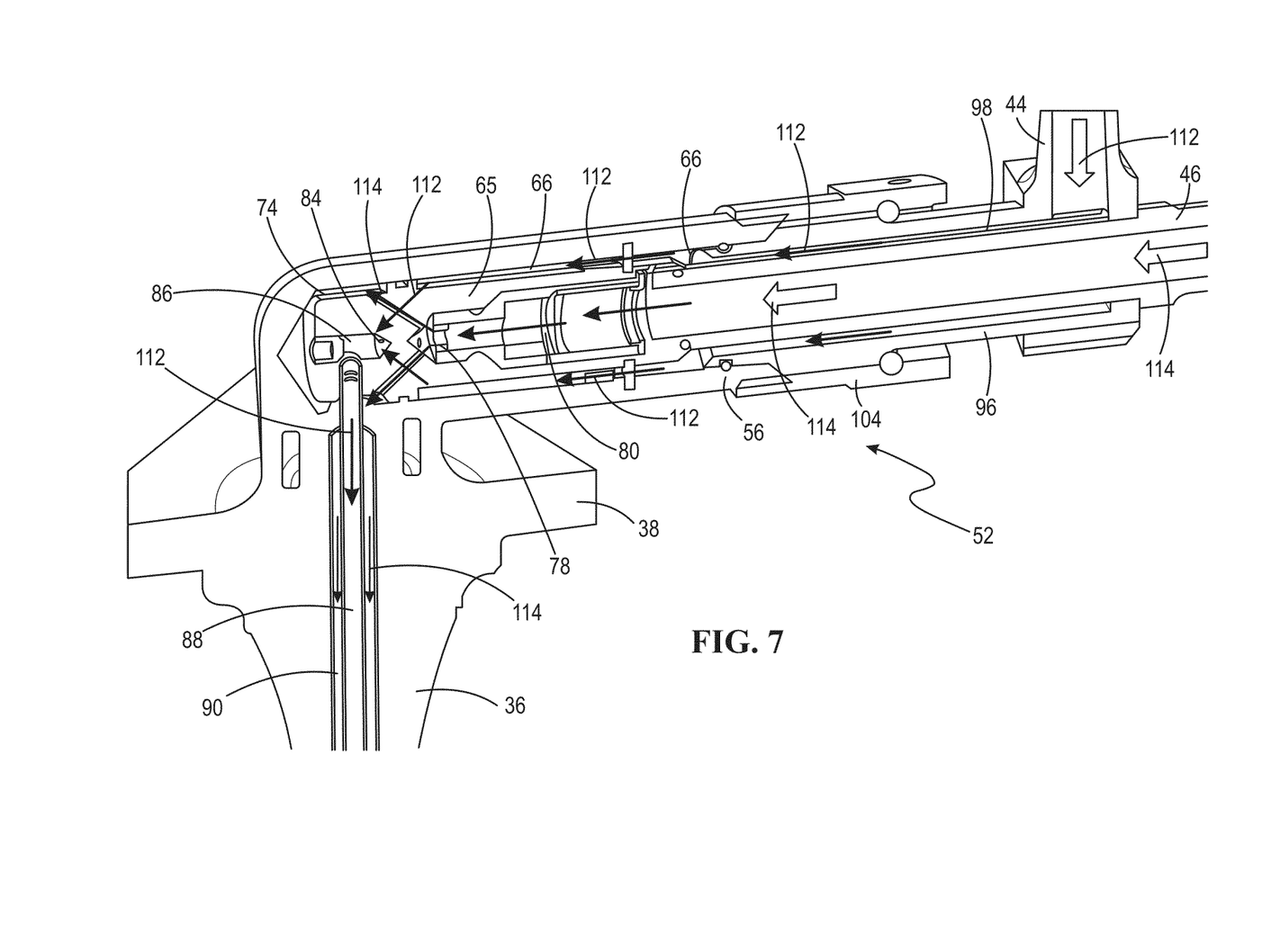
FIG. 7 is a sectional view of the manifold fitting of FIG. 6 detailing the fluid flow through the fitting.

Another embodiment is depicted in FIGS. 6 and 7. As depicted, the tube 64 is connected to the sleeve 56 by an abutment 70. The abutment also separates the first sleeve cavity 66 from a second sleeve cavity 74, depicted as having an annular shape surrounding the tube 64. In one embodiment, the abutment 70 is created by brazing, however, other methods of creating the abutment are also possible. The second sleeve cavity 74 is formed between a proximal end 76 of the tube 64 and the elbow 54 of the sleeve 56. A first set of passageways 78 allow for fluid communication from a chamber 80 defined by the tube 64, through a tube bulkhead 82, and into the second sleeve cavity 74. As shown best in FIG. 6, in combination with FIG. 7, a second set of passageways 84 allows for fluid communication from the first sleeve cavity 66 through the tube bulkhead 82 and into a tube cavity 86. The first outlet 68 allows for fluid communication from the tube cavity 86 to a first fuel line 88, which in turn communicates with the fuel nozzle 32. The second outlet 72 allows for fluid communication from the second sleeve cavity 74 to a second fuel line 90. As will be noted, the second fuel line 90 surrounds the first fuel line 88 and also allows for fluid communication with the fuel nozzle 32. In effect, the tube 64 depicted in FIGS. 6 and 7 allows an inner diameter fluid flow to become an outer diameter fluid flow and an outer diameter fluid flow to become an inner diameter fluid flow without mixing of the flows.

Referring now to the distal end 62 of the fitting 52, FIGS. 6 and 7 also show that the second manifold 46 is secured inside a distal end 92 of the tube 64. In so doing, the manifold 46 is placed in fluid communication with the chamber 80. An o-ring 94 or other sealing mechanism may be used to ensure a fluid tight seal between the manifold 46 and the tube 64. From such views, it can also be seen that the first manifold 44 intersects the fitting 52 at the distal end 62 so as to be in fluid communication with the first sleeve cavity 66. To facilitate such a connection, the manifold fitting 52 may include a fitting 96 which circumscribes the second manifold 46 and defines a cavity 98 therebetween. A distal end 100 of the fitting 96 may be sealed against the second manifold 46 at a juncture 101, while a proximal end 102 of the fitting 96 may be mounted inside the sleeve 56 and sealed thereto by an o-ring 103 or the like. In so doing, the cavity 98 is placed in fluid communication with the first sleeve cavity 66.

To further secure the components together, a generally tubular ferrule 104 may also circumscribe the fitting 96 and the sleeve 56. The ferrule 104 may provide extra structural support for the pigtail-sleeve joint and help to maintain fluid communication between the fitting and the sleeve. Another o-ring 105 may be used therebetween to provide a fluid-tight seal.

The manifold fitting 52 may further include filters for removing any unwanted debris from fluid traveling therethrough. As can be seen in FIGS. 6 and 7, a filter 106 may be positioned in the chamber 80 of the tube 64 to screen any fluid traveling from the second manifold 46, while a filter 108 may be positioned in the first sleeve cavity 66 around the tube 64 to screen unwanted debris from any fluid traveling from the first manifold 44.

A flow limiter 110 may also be positioned in the chamber 80 of the tube 64. As shown in FIGS. 6 and 7, the flow limiter 110 may be constructed to allow only a certain percentage of the fluid flow from the second manifold 46 to pass through to the second fuel line 90. This flow limiter 110 may be replaced by another of different dimension or design should the desired flow increase or decrease for any reason. Alternatively, an electronic flow limiter (not shown) may be provided to automatically adjust and thus limit the fluid flow without need for disassembly of the manifold fitting 44 or insertion of a new flow limiter 110.

Figure 8:
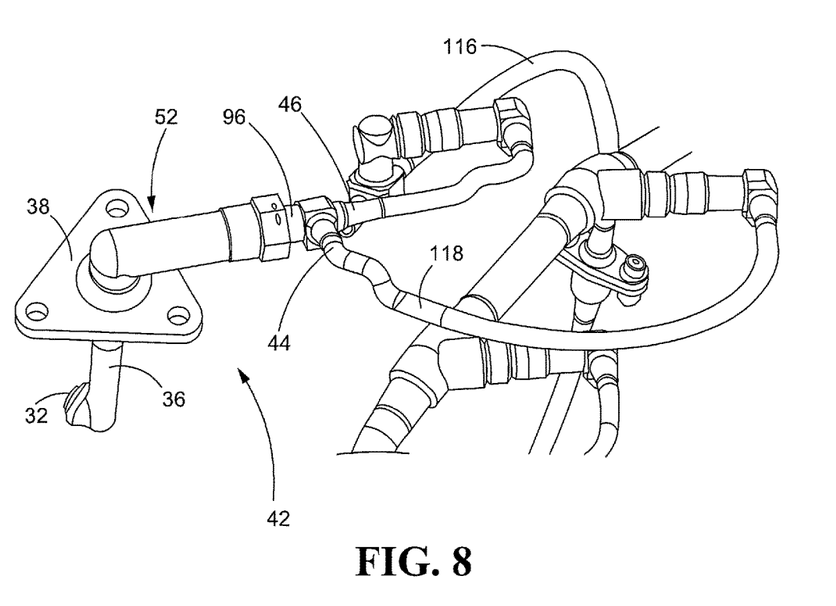
FIG. 8 is a perspective view of a fuel injector and fuel supply constructed in accordance with an embodiment of the present disclosure.

Although not shown, it is to be understood that the primary and secondary flows 112 and 114 may be provided by a single fuel supply. Alternatively, as depicted in FIG. 8, each flow may be provided by a separate fuel supply. Specifically, the first manifold 44 may be in fluid communication with a first fuel supply 116, and the second manifold 46 may be in fluid communication with a second fuel supply 118. Such a split fuel supply may allow more precise control of the primary and secondary flow 112 and 114 volumes than with a single fuel supply.

In operation, a primary flow 112 of fuel may enter into the fitting 52 via the first manifold 44. Such flow is best illustrated by the directional arrows of FIG. 7. The primary flow 112 may then flow axially through the cavity 98 and into the first sleeve cavity 66. From the first sleeve cavity 66, the primary flow 112 may then flow through the second set of passageways 84 into the tube cavity 86 and through the first fuel line 88 to the fuel nozzle 32. Additionally, a secondary flow 114 of fuel may flow axially through the second manifold 46 into the chamber 80. From the chamber 80 the secondary flow 114 may then flow through the first set of passageways 78 into the second sleeve cavity 74 and through the second fuel line 90 to the fuel nozzle 32. The primary flow 112 and secondary flow 114 are fully separated and thus cannot interact. In so doing, primary and secondary flows of fuel may be individually provided to the fuel nozzle 32 through a single manifold fitting 52, while at the same time doing so with a reduced radial height and geometric footprint.

INDUSTRIAL APPLICABILITY

From the foregoing, it can be seen that the technology disclosed herein has industrial applicability in a variety of settings such as, but not limited to reducing the geometric footprint of a fuel injector of a gas turbine engine. Such a reduced-size fuel injector does not impose upon the strict size and weight limitations to which gas turbine engines must abide when utilized in conjunction with aircraft. Additionally, the present disclosure sets forth a manifold fitting with a reduced part count as opposed to prior art manifold fittings. This reduction in parts reduces maintenance requirements, inventory demands, and the weight of the fuel injector; all of which are beneficial in aircraft gas turbine engines where size and weight are always at a premium.

While the present disclosure has been in reference to a gas turbine engine and an aircraft and specifically to fuel injectors, one skilled in the art will understand that the teachings herein can be used in other applications as well such as, but not limited to, communicating any fluids requiring sealed, dual flows. It is therefore intended that the scope of the invention not be limited by the embodiments presented herein as the best mode for carrying out the invention, but rather that the scope of invention include all equivalents falling within the spirit and scope of the appended claims as well.

What is claimed is:

1. A manifold fitting assembly, comprising:
   a tube;
   a sleeve surrounding the tube, the sleeve and the tube extending along a longitudinal centerline of the manifold fitting assembly and forming a first sleeve cavity therebetween;
   a first manifold intersecting the manifold fitting assembly radial to the longitudinal centerline and in fluid communication with the first sleeve cavity, wherein the first manifold extends circumferentially about the longitudinal centerline;
   a second manifold intersecting the manifold fitting assembly co-axial with the longitudinal centerline and in fluid communication with the tube;
   a first outlet radial to the longitudinal centerline and in fluid communication with the first sleeve cavity;
   a second outlet radial to the longitudinal centerline and in fluid communication with the tube;
   wherein the tube defines a chamber in fluid communication with the second manifold and the second outlet, and the tube further defines a tube cavity in fluid communication with the first sleeve cavity and the first outlet; and
   wherein the sleeve and the tube are connected by an abutment, the abutment forming a second sleeve cavity between the tube and the sleeve, and the second sleeve cavity communicating between the chamber and the second outlet.

2. The manifold fitting assembly of claim 1, further comprising a first manifold fitting circumscribing the second manifold and defining a first manifold cavity therebetween, the first manifold cavity being in fluid communication with the first sleeve cavity, and the first manifold intersecting and communicating through the first manifold fitting to the first manifold cavity.

3. The manifold fitting assembly of claim 2, wherein the first manifold fitting is sealed with the sleeve and the second manifold is sealed with the tube.

4. The manifold fitting assembly of claim 3, wherein a first o-ring seals the first manifold fitting with the sleeve and a second o-ring seals the second manifold with the tube.

5. The manifold fitting assembly of claim 2, wherein a ferrule surrounds and seals a joint between the first manifold fitting and the sleeve.

6. The manifold fitting assembly of claim 1, further comprising a fluid filter positioned inside of the tube.

7. The manifold fitting assembly of claim 1, further comprising a fluid filter positioned in the first sleeve cavity.

8. The manifold fitting assembly of claim 1, further comprising a flow limiter positioned inside of the tube.

9. A manifold fitting assembly, comprising:
   a tube;
   a sleeve surrounding the tube and forming a first sleeve cavity therebetween, the first sleeve cavity being in fluid communication with a first outlet, and the tube being in fluid communication with a second outlet;
   a second manifold coaxial, and in fluid communication, with the tube;
   a first manifold fitting circumscribing the second manifold and defining a first manifold cavity therebetween, the first manifold cavity being in fluid communication with the first sleeve cavity;
   a first manifold radially extending from the first manifold fitting and being in fluid communication with the first manifold cavity, wherein the first manifold extends circumferentially about a longitudinal centerline of the manifold fitting assembly;
   wherein the tube defines a chamber in fluid communication with the second manifold and the second outlet, and the tube further defines a tube cavity in fluid communication with the first sleeve cavity and the first outlet; and
   wherein the sleeve and the tube are connected by an abutment, the abutment forming a second sleeve cavity between the tube and the sleeve, and the second sleeve cavity communicating between the chamber of the tube and the second outlet.

10. The manifold fitting assembly of claim 9, wherein a ferrule surrounds and seals a joint between the first manifold fitting and the sleeve.

11. The manifold fitting assembly of claim 9, wherein the first manifold is sealed with the sleeve and the second manifold is sealed with the tube.

12. The manifold fitting assembly of claim 11, wherein a first o-ring seals the first manifold with the sleeve and a second o-ring seals the second manifold with the tube.

13. A fuel injector of a combustor, the fuel injector comprising:
   a fuel nozzle extending into the combustor;
   a stem extending away from the fuel nozzle;
   a manifold fitting assembly extending from the stem and having a longitudinal centerline extending in a non-radial direction with respect to the combustor, the manifold fitting assembly including a tube and a sleeve circumscribing the tube to define a first sleeve cavity therebetween;
   a first manifold intersecting the manifold fitting assembly radial to the longitudinal centerline and in fluid communication with the first sleeve cavity, wherein the first manifold extends circumferentially about the longitudinal centerline;
   a second manifold intersecting the manifold fitting assembly co-axial, and in fluid communication, with the tube;
   a first outlet radial to the longitudinal centerline and in fluid communication with the first sleeve cavity;
   a second outlet radial to the longitudinal centerline and in fluid communication with the tube;
   wherein the tube defines a chamber in fluid communication with the second manifold and the second outlet, and the tube further defines a tube cavity in fluid communication with the first sleeve cavity and the first outlet; and
   wherein the sleeve and the tube are connected by an abutment, the abutment forming a second sleeve cavity between the tube and the sleeve, and the second sleeve cavity communicating between the chamber and the second outlet.

14. The fuel injector of claim 13, wherein each manifold is in communication with a separate fuel supply.

15. The fuel injector of claim 13, further comprising a first manifold fitting circumscribing the second manifold and defining a first manifold cavity therebetween, the first manifold cavity being in fluid communication with the first sleeve cavity, and the first manifold intersecting and communicating through the first manifold fitting to the first manifold cavity.

* * * * *